US012567540B2

(12) United States Patent  
Wakamatsu et al.

(10) Patent No.: US 12,567,540 B2  
(45) Date of Patent: Mar. 3, 2026

(54) MULTILAYER CERAMIC CAPACITOR

(71) Applicant: Murata Manufacturing Co., Ltd., Nagaokakyo (JP)

(72) Inventors: Toru Wakamatsu, Nagaokakyo (JP); Daisuke Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 183 days.

(21) Appl. No.: 18/373,347

(22) Filed: Sep. 27, 2023

(65) Prior Publication Data

US 2024/0021371 A1     Jan. 18, 2024

Related U.S. Application Data

(63) Continuation of application No. PCT/JP2022/015247, filed on Mar. 29, 2022.

(30) Foreign Application Priority Data

Mar. 31, 2021     (JP) ................................. 2021-058926

(51) Int. Cl.  
*H01G 4/30* (2006.01)  
*H01G 4/008* (2006.01)  
*H01G 4/12* (2006.01)

(52) U.S. Cl.  
CPC ............. *H01G 4/0085* (2013.01); *H01G 4/30* (2013.01); *H01G 4/1227* (2013.01)

(58) Field of Classification Search  
CPC ........ H01G 4/005; H01G 4/2325; H01G 4/30; H01G 4/1227; H01G 4/008; H01G 4/012  
See application file for complete search history.

(56) References Cited

U.S. PATENT DOCUMENTS

2013/0321980 A1     12/2013  Suzuki et al.  
2015/0380165 A1*    12/2015  Oguni .................... H01G 4/018  
                                                                            156/89.18

(Continued)

FOREIGN PATENT DOCUMENTS

JP              H1012478 A        1/1998  
JP              H11162777 A       6/1999

(Continued)

OTHER PUBLICATIONS

English machine translation of JP2021086861A (Year: 2021).*

(Continued)

*Primary Examiner* — Timothy J. Dole  
*Assistant Examiner* — Esther N Lian  
(74) *Attorney, Agent, or Firm* — Keating & Bennett, LLP

(57)     ABSTRACT

In a multilayer ceramic capacitor including first and second inner electrodes alternately arranged with respect to a stacking direction of a multilayer body, a polarity based on a direction of voltage applied between a first outer electrode and a second outer electrode is determined such that the first inner electrodes function as positive electrodes and the second inner electrodes function as negative electrodes. The first inner electrodes have a first metal composition including Ni as a main component, and the second inner electrodes have a second metal composition including Cu as a main component. The first metal composition may include Sn as an additive component. The second metal composition may include at least one metal element selected from Au, Pt, Ir, Pd, Os, Ag, Rh, and Ru as an additive component.

16 Claims, 1 Drawing Sheet

(56)         References Cited

U.S. PATENT DOCUMENTS

| | | | |
|---|---|---|---|
| 2016/0118188 A1* | 4/2016 | Wada ................. | C04B 35/4682 |
| | | | 29/25.42 |
| 2016/0358713 A1 | 12/2016 | Doi et al. | |
| 2017/0309400 A1* | 10/2017 | Yamaguchi ............. | H01G 4/30 |
| 2017/0316883 A1* | 11/2017 | Yamaguchi ............. | B32B 18/00 |
| 2018/0075975 A1* | 3/2018 | Hattori .................. | H01G 4/232 |
| 2019/0180940 A1* | 6/2019 | Ariga .................. | H01G 4/1236 |
| 2019/0304696 A1 | 10/2019 | Kim et al. | |
| 2020/0312561 A1* | 10/2020 | Wakashima ......... | H01G 4/0085 |
| 2021/0020377 A1* | 1/2021 | Kurosu .................. | H01G 4/12 |
| 2021/0202177 A1* | 7/2021 | Kurosu ................. | H01G 4/008 |
| 2021/0366658 A1* | 11/2021 | Yamato ............... | H01G 4/1227 |

FOREIGN PATENT DOCUMENTS

| | | | | |
|---|---|---|---|---|
| JP | H11283867 A | 10/1999 | | |
| JP | H11340083 A | 12/1999 | | |
| JP | 2004128136 A | 4/2004 | | |
| JP | 2017005019 A | 1/2017 | | |
| JP | 6104853 B2 | 3/2017 | | |
| JP | 2019176120 A | 10/2019 | | |
| JP | 2021086861 A * | 6/2021 | .............. | H01G 4/30 |
| WO | 2012111592 A1 | 8/2012 | | |

OTHER PUBLICATIONS

International Search Report in PCT/JP2022/015247, mailed Jun. 28, 2022, 3 pages.
Written Opinion in PCT/JP2022/015247, mailed Jun. 28, 2022, 4 pages.

* cited by examiner

MULTILAYER CERAMIC CAPACITOR

CROSS REFERENCE TO RELATED APPLICATIONS

This application claims the benefit of priority to Japanese Patent Application No. 2021-058926 filed on Mar. 31, 2021 and is a Continuation application of PCT Application No. PCT/JP2022/015247 filed on Mar. 29, 2022. The entire contents of each application are hereby incorporated herein by reference.

BACKGROUND OF THE INVENTION

1. Field of the Invention

The present invention relates to a multilayer ceramic capacitor, in particular, to a metal composition of an inner electrode of a multilayer ceramic capacitor.

2. Description of the Related Art

Recent development in electronic technology requires multilayer ceramic capacitors with smaller size and higher capacitance. In order to meet these requirements, dielectric layers of multilayer ceramic capacitors are becoming thinner. However, thickness reduction of dielectric layers relatively increases the intensity of electric field applied to each layer. Therefore, it is desirable to improve reliability during voltage application.

In general, a multilayer ceramic capacitor includes a multilayer body that includes multiple dielectric layers that are stacked on top of each other and multiple inner electrodes disposed along interfaces between the dielectric layers, and multiple outer electrodes that are formed on outer surfaces of the multilayer body and are electrically connected to the inner electrodes. Here, there is a known inner electrode that includes Ni as a main component, as described in Japanese Unexamined Patent Application Publication No. 11-283867.

SUMMARY OF THE INVENTION

However, the issue with the inner electrode including Ni as a main component is that the reliability during voltage application is insufficient to meet the recent demand for miniaturization and higher capacitance.

Preferred embodiments of the present invention provide multilayer ceramic capacitors that each have thinner dielectric layers and exhibit excellent reliability even when voltage of a high electric field intensity is applied.

A multilayer ceramic capacitor according to a preferred embodiment of the present invention includes a multilayer body that includes multiple dielectric layers that are made of a ceramic and are stacked on top of each other, and multiple inner electrodes along interfaces between the dielectric layers, and multiple outer electrodes on outer surfaces of the multilayer body and electrically connected to the inner electrodes.

The inner electrodes include multiple first inner electrodes and multiple second inner electrodes that are alternately arranged with respect to a stacking direction of the multilayer body, and the outer electrodes include a first outer electrode electrically connected to the first inner electrodes and a second outer electrode electrically connected to the second inner electrodes.

In a preferred embodiment of the present invention, a polarity based on a direction of voltage applied between the first outer electrode and the second outer electrode is determined such that the first inner electrodes function as positive electrodes and the second inner electrodes function as negative electrodes, the first inner electrodes have a first metal composition including Ni as a main component, and the second inner electrodes have a second metal composition including Cu as a main component.

Note that the first metal composition and the second metal composition are different from each other in terms of at least one of the types and contents of the constituent elements.

Regarding the metal compositions of the inner electrodes, the "main component" refers to a metal element having the highest content among all metal elements, more specifically, a content higher than or equal to 50%.

According to preferred embodiments of the present invention, insulation degradation of a multilayer ceramic capacitor during voltage application is reduced or prevented, and thus multilayer ceramic capacitors each with excellent reliability can be obtained.

In addition, since currently widely used and inexpensive metals such as Ni and Cu can be used as the conductive materials of the first and second inner electrodes, the cost efficiency of the multilayer ceramic capacitor can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
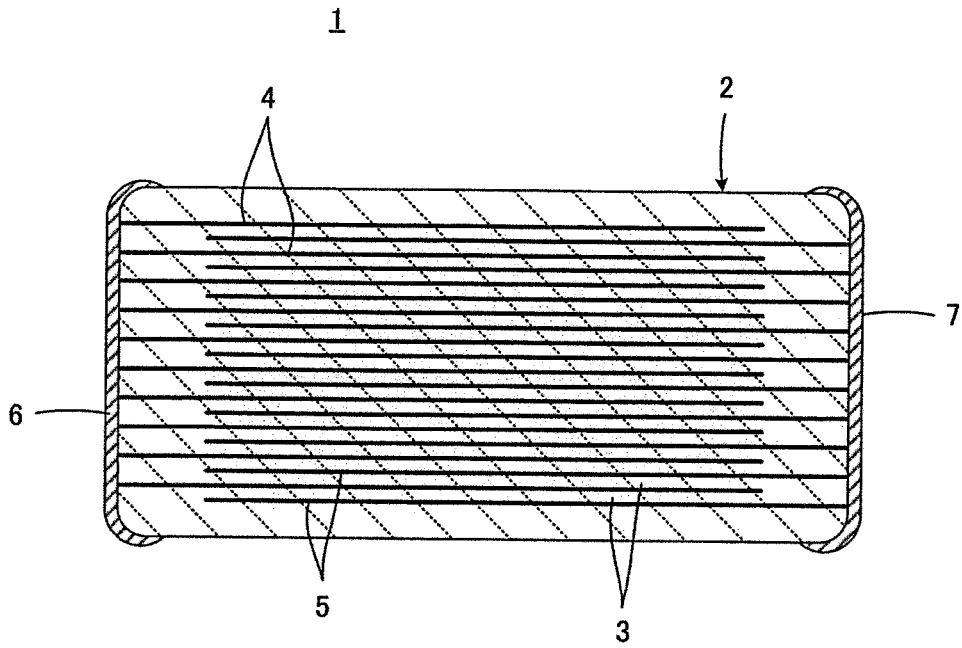
FIG. 1 is a cross-sectional view schematically showing a multilayer ceramic capacitor 1 according to a preferred embodiment of the present invention.

The structure of a multilayer ceramic capacitor 1 according to a preferred embodiment of the present invention will now be described with reference to FIG. 1.

The multilayer ceramic capacitor 1 includes a multilayer body 2. The multilayer body 2 includes multiple dielectric layers 3 that are made of a ceramic and are stacked on top of each other, and multiple inner electrodes 4 and 5 that are disposed along interfaces between the dielectric layers 3. The inner electrodes 4 and 5 are classified into multiple first inner electrodes 4 and multiple second inner electrodes 5 that are alternately arranged with respect to the stacking direction of the multilayer body 3. An outer electrode 6 and an outer electrode 7 are respectively disposed on outer surfaces, more specifically, opposing end surfaces, of the multilayer body 2. The outer electrodes 6 and 7 are classified into a first outer electrode 6 electrically connected to the first inner electrodes 4, and a second outer electrode 7 electrically connected to the second inner electrodes 5.

The compositions of the inner electrodes 4 and 5 are described below. The outer electrodes 6 and 7 include, for example, Ag or Cu as a main component of the conductive component. The dielectric layers 3 preferably include a dielectric ceramic that includes, as a main component, a perovskite compound that includes Ba and Ti (however, some of Ba may be substituted with Ca, and some of Ti may be substituted with Zr). In particular, high permittivity is exhibited when the main component of dielectric layers 3 is $BaTiO_3$, and the multilayer ceramic capacitor 1 exhibits excellent reliability. Note that the dielectric layers 3 may include, in addition to the aforementioned main component, rare earth elements, Mn, Mg, Si, etc., for example, as sub components.

The raw material powder of the dielectric ceramic is, for example, produced by a solid phase synthesis method. Specifically, first, compound powders of oxides, carbonates, etc., that include constituent elements of the main component are mixed in predetermined proportions and calcined. Instead of the solid phase synthesis method, a hydrothermal method and other appropriate methods may be applied. Here, the dielectric ceramic may include alkali metals, transition metals, Cl, S, P, Hf, etc., as long as the amounts thereof do not obstruct the advantageous effects of the present invention.

The multilayer ceramic capacitor 1 is, for example, produced as follows. A ceramic slurry is prepared by using raw material powder of the dielectric ceramic obtained as described above. Next, ceramic green sheets are formed by a sheet forming method or the like. Next, a conductive paste that will form the inner electrodes 4 and 5 are applied, by printing or the like, to particular ceramic green sheets selected from among these ceramic green sheets. Then the ceramic green sheets are stacked on top of each other and pressure-bonded to obtain a green multilayer body. Next, the green multilayer body is fired. In this firing step, dielectric layers 3 including a dielectric ceramic are obtained. Subsequently, outer electrodes 6 and 7 are formed on end surfaces of the multilayer body 3 by baking or the like.

One of the unique features of the multilayer ceramic capacitor 1 is that the polarity based on the direction of the voltage applied between the first outer electrode 6 and the second outer electrode 7 is determined such that the first inner electrodes 4 function as positive electrodes and the second inner electrodes 5 function as negative electrodes in actual use. Therefore, although not illustrated, a mark that indicates the polarity is preferably put on, for example, an outer surface of the multilayer ceramic capacitor 1.

In this regard, a multilayer ceramic capacitor according to a preferred embodiment of the present invention is not limited to the two-terminal type equipped with the first outer electrode 6 and the second outer electrode 7 as shown in FIG. 1, but may also be a multi-terminal type equipped with three or more outer electrodes. In this case, the voltage may be applied between particular two sets of outer electrodes selected from among the three or more outer electrodes, in other words, between at least one first outer electrode and at least one second outer electrode, such that the first inner electrodes function as positive electrodes and the second inner electrodes function as negative electrodes.

Another of the unique features of the multilayer ceramic capacitor 1 is that the metal compositions of the first inner electrodes 4 and the second inner electrodes 5 are selected as follows. That is, the first inner electrodes 4, which function as positive electrodes, have a first metal composition including Ni as a main component, and the second inner electrodes 5, which function as negative electrodes, have a second metal composition including Cu as a main component.

Such a choice of the metal compositions of the first inner electrodes 4 and the second inner electrodes 5 is based on the following findings.

Although the insulation degradation mechanism of typical multilayer ceramic capacitors is not yet elucidated, it is known that negative electrode segregation of oxygen ions (positive electrode segregation of oxygen vacancies) caused by voltage application triggers the degradation. Therefore, it is expected that the insulation degradation of the multilayer ceramic capacitor can be reduced or prevented by reducing or preventing the negative electrode segregation of oxygen ions. In this regard, a possible approach is to have positive electrodes include an element that gives a stable oxide and to have negative electrodes include an element that gives unstable oxide. According to this idea, negative electrode segregation can be reduced or prevented by allowing reduction reactions (release of oxygen ions) to occur in the negative electrodes.

More specifically, regarding the metal compositions of the first inner electrodes 4 and the second inner electrodes 5, metal elements that have a tendency to undergo an increase in valency (low standard electrode potential) are used in the first inner electrodes 4 that function as positive electrodes, and metal elements that have a tendency to undergo a decrease in valency (high standard electrode potential) are used in the second inner electrodes 5 that function as negative electrodes. A standard electrode potential is a value inherent to the element, the lower the value, the more stable the oxide, and the higher the value, the more unstable the oxide.

Figure 2:
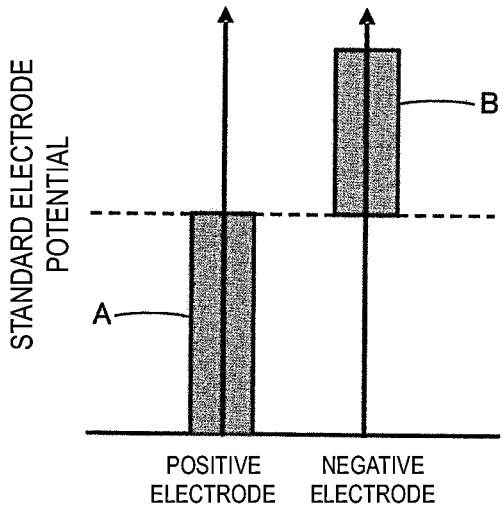
FIG. 2 is a diagram showing standard electrode potentials of metal elements included in first inner electrodes (positive electrodes) 4 and second inner electrodes (negative electrodes) 5 in the multilayer ceramic capacitor 1 illustrated in FIG. 1.

That is, as illustrated in FIG. 2, the second inner electrodes 5 that function as negative electrodes are to include metal elements having standard electrode potentials higher than the standard electrode potentials of the metal elements in the first inner electrodes 4 that function as positive electrodes. In FIG. 2, the standard electrode potential of the first metal composition of the first inner electrodes 4 functioning as positive electrodes is to be within the range A, and the standard electrode potential of the second metal composition of the second inner electrodes 5 functioning as negative electrodes is to be within the range B.

The standard electrode potentials of the metal elements that can be included in the metal compositions of the inner electrodes 4 and 5 are, in the ascending order:

−0.26 V for Ni,
−0.14 V for Sn,
+0.34 V for Cu,
+0.46 V for Ru,
+0.76 V for Rh,
+0.8 V for Ag,
+0.9 V for Os,
+0.92 V for Pd,
+1.16 V for Ir,
+1.19 V for Pt, and
+1.52 V for Au.

Whereas the standard electrode potential of Ni included as a main component of the first metal composition of the first inner electrodes 4 is −0.26 V and the standard electrode potential of Sn which can be used as an additive component is −0.14 V, Cu included as the main component of the second metal composition of the second inner electrodes 5 and Au, Pt, Ir, Pd, Os, Ag, Rh, and Ru included as additive components all have a standard electrode potential higher than those of Ni and Sn.

Thus, Cu included as a main component and at least one metal element selected from Au, Pt, Ir, Pd, Os, Ag, Rh, and Ru included as an additive component in the second metal composition of the second inner electrodes 5 functioning as negative electrodes can induce the reduction reaction (release of oxygen ions) in the second inner electrodes 5 functioning as negative electrodes, and thus can reduce or prevent negative electrode segregation of oxygen ions.

Thus, according to this preferred embodiment focusing on the redox reaction in the inner electrodes 4 and 5, the negative electrode segregation of oxygen ions (positive electrode segregation of oxygen vacancies) caused by voltage application is reduced or prevented by utilizing the redox reaction. As a result, the insulation degradation of the multilayer ceramic capacitor during voltage application can be reduced or prevented, and a multilayer ceramic capacitor having excellent reliability can be obtained.

The first metal composition of the first inner electrodes 4 may include Sn as an additive component.

When Sn is included, the reliability of the multilayer ceramic capacitor 1 during voltage application can be further improved.

The second metal composition of the second inner electrodes 5 may include at least one metal element selected from Au, Pt, Ir, Pd, Os, Ag, Rh, and Ru, which have standard electrode potentials higher than that of Cu, as an additive component. In this case, as mentioned above, the higher the standard electrode potential, the more unstable the oxide. Thus, the effect of reducing or preventing the negative electrode segregation of oxygen ions brought about by the aforementioned metal elements included as additive components increases in the order of Cu, Ru, Rh, Ag, Os, Pd, Ir, Pt, and Au, which is the ascending order of the standard electrode potential. Au, Pt, Ir, Pd, Os, Ag, Rh, and Ru are noble metals.

It should be noted that, when the first metal composition of the first inner electrodes 4 includes multiple metal elements or when the second metal composition of the second inner electrodes 5 includes multiple metal elements, these metal elements are included in the conductive paste applied to the ceramic green sheets used to produce the multilayer ceramic capacitor 1. Here, the multiple metal elements may be preliminarily prepared as an alloy or intermetallic compound including these metal elements and then included in the conductive paste, or may be separately included in the conductive paste.

In addition, when the first metal composition of the first inner electrodes 4 includes multiple metal elements or the second metal composition of the second inner electrodes 5 includes multiple metal elements, these multiple metal elements are preferably alloyed in the multilayer ceramic capacitor 1 as a product.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers that are made of a ceramic and are stacked on top of each other, and a plurality of inner electrodes along interfaces between the plurality of dielectric layers; and
a plurality of outer electrodes on outer surfaces of the multilayer body and electrically connected to the plurality of inner electrodes; wherein
the plurality of inner electrodes include a plurality of first inner electrodes and a plurality of second inner electrodes that are alternately arranged with respect to a stacking direction of the multilayer body;
the plurality of outer electrodes include a first outer electrode electrically connected to the plurality of first inner electrodes and a second outer electrode electrically connected to the plurality of second inner electrodes;
a polarity based on a direction of voltage applied between the first outer electrode and the second outer electrode is determined such that the plurality of first inner electrodes function as positive electrodes and the plurality of second inner electrodes function as negative electrodes;
the first inner electrodes have a first metal composition that includes Ni as a main component; and
the second inner electrodes have a second metal composition that includes Cu as a main component.

2. The multilayer ceramic capacitor according to claim 1, wherein the first metal composition of the first inner electrodes includes Sn as an additive component.

3. The multilayer ceramic capacitor according to claim 1, wherein the second metal composition of the second inner electrodes includes at least one metal element selected from Au, Pt, Ir, Pd, Os, Ag, Rh, and Ru, which have standard electrode potentials higher than that of Cu, as an additive component.

4. The multilayer ceramic capacitor according to claim 1, wherein the first outer electrode and the second outer electrode include Ag or Cu.

5. The multilayer ceramic capacitor according to claim 1, wherein the plurality of dielectric layers include as a main component a perovskite compound including Ba and Ti.

6. The multilayer ceramic capacitor according to claim 5, wherein some of Ba is substituted with Ca.

7. The multilayer ceramic capacitor according to claim 5, wherein some of Ti is substituted with Zr.

8. The multilayer ceramic capacitor according to claim 1, wherein the plurality of dielectric layers include $BaTiO_3$.

9. The multilayer ceramic capacitor according to claim 1, wherein the plurality of dielectric layers include a dielectric ceramic and at least one of rare earth elements, Mn, Mg, or Si.

10. The multilayer ceramic capacitor according to claim 1, wherein the plurality of dielectric layers include at least one of alkali metals, transition metals, CI, S, P or Hf.

11. The multilayer ceramic capacitor according to claim 1, wherein the multilayer ceramic capacitor is a two-terminal capacitor.

12. The multilayer ceramic capacitor according to claim 1, wherein the multilayer ceramic capacitor is a multi-terminal capacitor including three or more outer electrodes.

13. The multilayer ceramic capacitor according to claim 1, wherein the second composition of the plurality of second inner electrodes includes multiple metal elements.

14. The multilayer ceramic capacitor according to claim 13, wherein the multiple metal elements in the second composition are alloyed as a product.

15. The multilayer ceramic capacitor according to claim 1, wherein the first composition of the plurality of first inner electrodes includes multiple metal elements.

16. The multilayer ceramic capacitor according to claim 15, wherein the multiple metal elements in the first composition are alloyed as a product.

* * * * *